United States Patent
Evans

(10) Patent No.: US 7,231,636 B1
(45) Date of Patent: Jun. 12, 2007

(54) SYSTEM AND METHOD FOR TRACKING VOICEXML DOCUMENT EXECUTION IN REAL-TIME

(75) Inventor: Daniel Evans, Huntington, NY (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1119 days.

(21) Appl. No.: 10/028,355

(22) Filed: Dec. 21, 2001

(51) Int. Cl.
*G06F 9/44* (2006.01)
*G06F 9/45* (2006.01)
*G10L 15/00* (2006.01)
*H04M 1/00* (2006.01)

(52) U.S. Cl. .................. 717/127; 717/128; 717/139; 717/140; 704/231; 379/88.17

(58) Field of Classification Search .......... 717/127, 717/128, 139, 140
See application file for complete search history.

(56) References Cited

U.S. PATENT DOCUMENTS 6,895,084 B1*  5/2005  Saylor et al. ............ 379/88.22
7,031,444 B2*  4/2006  Shen et al. ................ 379/88.17
2002/0191756 A1* 12/2002  Guedalia et al. ......... 379/88.13
2003/0118159 A1*  6/2003  Shen et al. ................ 379/88.04

OTHER PUBLICATIONS

VoiceGenie Announces GenieTracer™, the PC-Based Voice XML Run-time Simulator for Rapid Voice Web Application Development, *VoiceGenie Developer Web Site Surpasses 2,000 VoiceXML Developers*, (Press Release, Apr. 9, 2001) 2 pages.
Nuance V-Builder™, *A complete graphical tool for building VoiceXML sites*, 2 pages.
VoiceXML Forum, *Voice eXtensible Markup Language VoiceXML*, Version 1.00, (Date: Mar. 7, 2000), 101 pages.

* cited by examiner

*Primary Examiner*—Tuan Dam
*Assistant Examiner*—Isaac Tecklu
(74) *Attorney, Agent, or Firm*—Haynes and Boone, LLP

(57) ABSTRACT

A method and apparatus for tracking execution of a VoiceXML document of a VoiceXML application by a VoiceXML execution client are disclosed. In one embodiment, the method includes trapping a desired VoiceXML document and executing the trapped document in an execution tracking mode as a function of marker information. The marker information is configured to enable a highlighting of a respective VoiceXML element within a listing of at least a portion of the VoiceXML document on a remote display.

23 Claims, 5 Drawing Sheets

```
<?xml version="1.0"?>                                              42
<!DOCTYPE vxml SYSTEM "vxml.dtd">
<!- this document is http://orderhost/topping.vxml -->

<vxml version="1.0">                                           44
      <meta name="author" value="Dan Evans"/>
      <form id="getTopping">

<property name="inputmodes" expr="voice"/>                 46
          <var name="flavor" expr="'onion'"/>

<field name="topping">                                   48
            <grammar>
              sausage | pepperoni | onions | [plain] cheese
            </grammar>
            <prompt>
              What topping would you like?
            </prompt>
          </field>

50(g)  <filled namelist="topping">    70
            <prompt>
              Your pizza topping is <value expr="topping"/>
            </prompt>
            <submit namelist="flavor" src="http://orderhost/pizza.cgi"/>
          </filled>
          <catch event="nomatch noinput">
            <prompt>
              Your choices are sausage, pepperoni, onions, or cheese.
            </prompt>
          <catch/>

</form>
    </vxml>
```

```
<?xml version="1.0"?>                                              42
<!DOCTYPE vxml SYSTEM "vxml:dtd">
<!-- this document is http://orderhost/topping.vxml -->
```

50(a) --MARKER--                                                   44
```
    <vxml version="1.0">
        <meta name="author" value="Dan Evans"/>
```
50(b) --MARKER--
```
    <form id="getTopping">
```

```
        <property name="inputmodes" expr="voice"/>                 46
```
50(c) --MARKER--
```
        <var name="flavor" expr="'onion'"/>
```

50(d) --MARKER--                                                   48
```
        <field name="topping">
```
50(e) --MARKER--
```
            <grammar>
                sausage | pepperoni | onions | [plain] cheese
            </grammar>
```
50(f) --MARKER--
```
            <prompt>
                What topping would you like?
            </prompt>
        </field>
```

50(g) --MARKER--
```
        <filled namelist="topping">
```
50(h) --MARKER--
```
            <prompt>
                Your pizza topping is <value expr="topping"/>
            </prompt>
```
50(i) --MARKER--
```
            <submit namelist="flavor" src="http://orderhost/pizza.cgi"/>
        </filled>
```
50(j) --MARKER--
```
        <catch event="nomatch noinput">
```
50(k) --MARKER--
```
            <prompt>
                Your choices are sausage, pepperoni, onions, or cheese.
            </prompt>
            <catch/>
```

```
    </form>
</vxml>
```

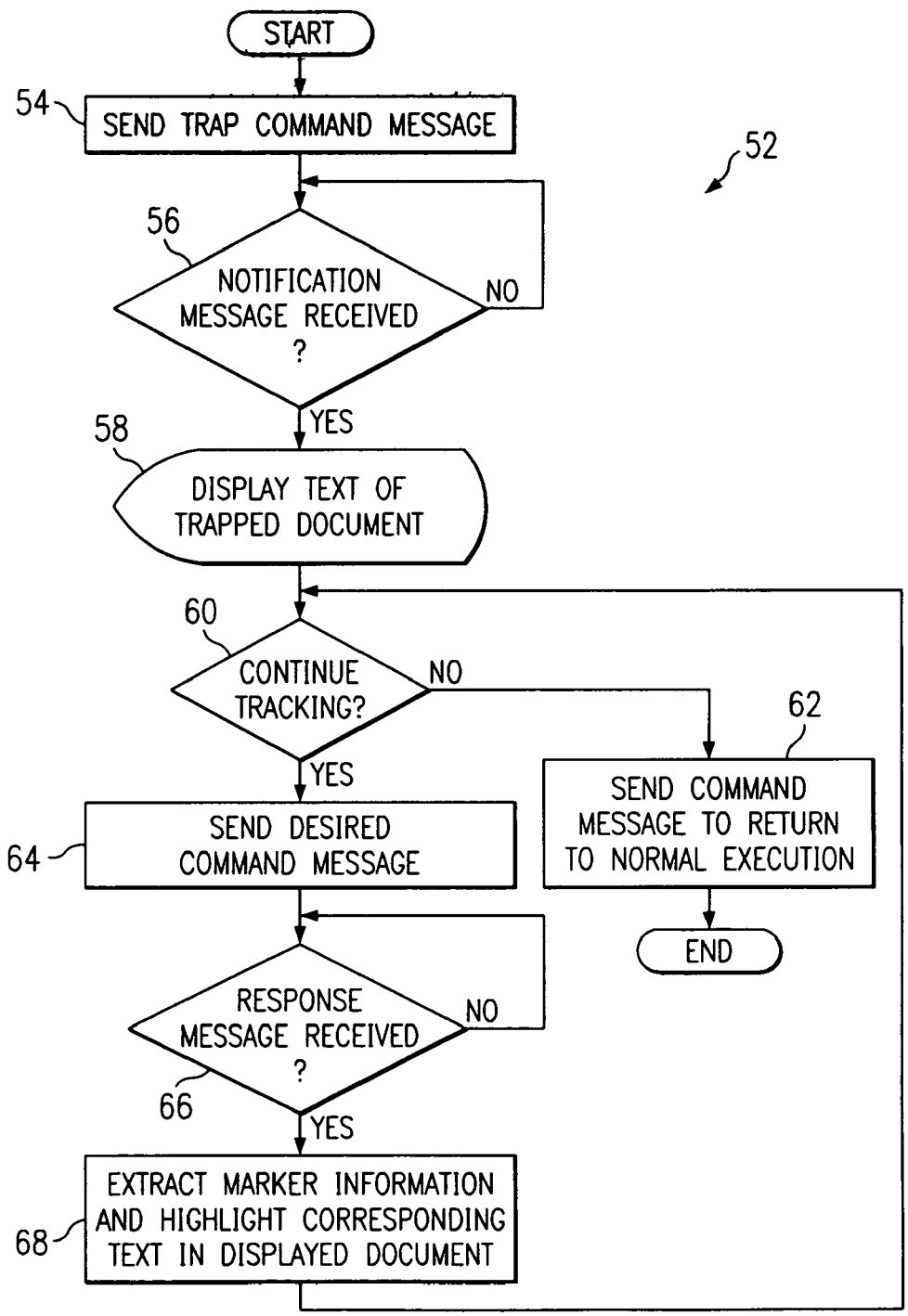

SYSTEM AND METHOD FOR TRACKING VOICEXML DOCUMENT EXECUTION IN REAL-TIME

FIELD OF THE INVENTION

The invention relates, generally, to VoiceXML document execution, and, more specifically, to a system and method for tracking VoiceXML document execution in real-time.

BACKGROUND OF THE INVENTION

Voice eXtensible Markup Language (VoiceXML or VXML) is a technology that allows a user to interact with the Internet through voice-recognition technology. Instead of a traditional browser that relies on a combination of HTML, a display, keyboard and mouse, VXML relies on a voice browser and/or the telephone. Using VXML, the user interacts with the voice browser by listening to audio output that is either pre-recorded or computer-synthesized and submits audio input through the user's natural speaking voice or through a keypad on a telephone. An overview of VoiceXML is contained in "Voice eXtensible Markup Language VoiceXML," Version 1.00, dated 7 Mar. 2000, written by the VoiceXML Forum and incorporated herein by reference.

With respect to the development and testing of a VXML application containing one or more VXML documents, execution tracking of the one or more VXML documents for debugging purposes is difficult. During execution of the application, the VXML documents do not reside on a VXML execution client. That is, the documents have existence on the VXML execution client only during a brief instant of time when each of the same are executing within the application, after the same have been downloaded from a document server (i.e., a web server). As a result of the limited existence on the VXML execution client, tracking of the particular VXML document during its execution is difficult for debugging purposes.

Accordingly, a system and method for tracking VoiceXML document execution in real-time is desired.

SUMMARY OF THE INVENTION

A method and apparatus for tracking execution of a VoiceXML document of a VoiceXML application by a VoiceXML execution client are disclosed. In one embodiment, the method includes trapping a desired VoiceXML document and executing the trapped document in an execution tracking mode as a function of marker information. The marker information is configured to enable a highlighting of a respective VoiceXML element within a listing of at least a portion of the VoiceXML document on a remote display.

BRIEF DESCRIPTION OF THE DRAWINGS

FIG. 2 illustrates an example VoiceXML document of a VoiceXML application;

FIG. 3 illustrates the example VoiceXML document of FIG. 2 including markers according to one embodiment of the present disclosure;

FIG. 4 is a flow diagram view of the tracking method according to one embodiment of the present disclosure as performed by a VoiceXML editor/execution tracker.

DETAILED DESCRIPTION

Presently, VoiceXML is a standard being promulgated by the VoiceXML Forum and the World Wide Web Consortium. VoiceXML is an extensible markup language (XML) for the creation of automated speech recognition (ASR) and interactive voice response (IVR) applications. Based on the XML tag/attribute format, the VoiceXML syntax involves enclosing instructions (items) within a tag structure. The VoiceXML standard utilizes the model of a web server for providing VXML documents (also referred to as a document server) and a VoiceXML execution client for conducting an interaction dialog according to respective VXML documents.

For example, in response to a telephone call for a VoiceXML application, a VoiceXML execution client downloads a VXML document from a document server, using the standard protocol of the World Wide Web, HTTP. The VXML document contains the logic necessary for automating the handling of the call.

The VXML execution client executes a VXML document by: 1) downloading a document from a document server using an associated Universal Resource Locator (URL); 2) compiling the document into an executable form; 3) executing the compiled form of the document; 4) requesting the next document, based upon information resulting from execution, and 5) repeating at step 1, or ending the call if no further documents are to be executed.

Figure 1:
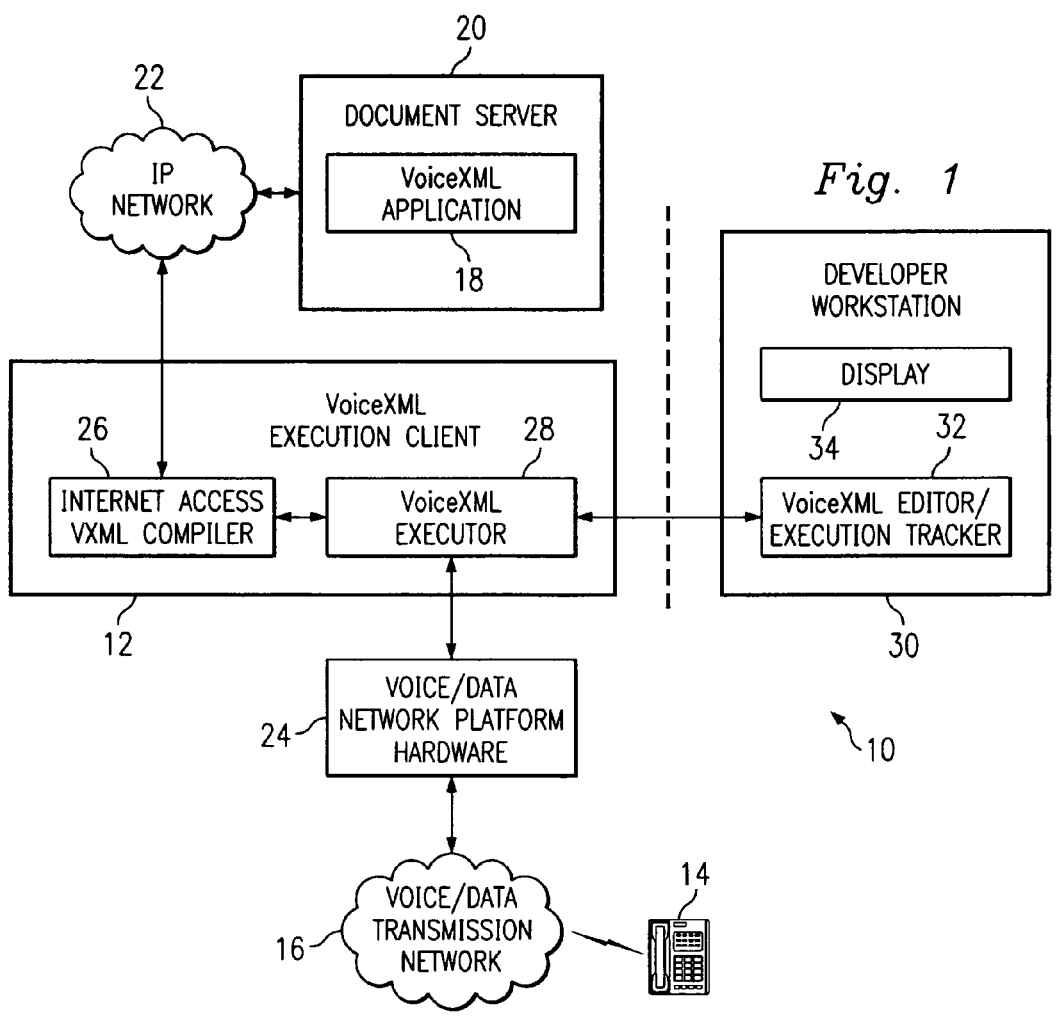
FIG. 1 illustrates a block diagram view of a system for development of VXML applications and tracking of VoiceXML document execution according to one embodiment of the present disclosure.

FIG. 1 illustrates a block diagram view of a system 10 for real-time tracking of VoiceXML document execution according to one embodiment of the present disclosure. The system 10 includes a VoiceXML execution client 12. System 10 utilizes a terminal 14 coupled to a voice/data transmission network 16 for accessing one or more VoiceXML applications 18 residing on at least one document server 20 via an Internet Protocol (IP) network 22. The voice/data transmission network 16 couples to the VoiceXML execution client 12 via voice/data network platform hardware 24.

Terminal 14 may include, but not be limited to, a telephone, for example. Voice/data transmission network 16 may include, but not be limited to, a telephone network, such as, a public switched telephone network (PSTN). Voice/data network platform hardware 24 may include, but not be limited to, telephony platform hardware generally known in the art. Lastly, the IP network 22 may include, but not be limited to, a global computer network, the Internet, or an intranet, for example.

The VoiceXML execution client 12 couples to the IP network 22, via suitable equipment and techniques known in the art. In one embodiment, VoiceXML execution client 12 includes an Internet access VXML compiler 26 and a VoiceXML executor 28, further as discussed below. The VoiceXML execution client 12 couples to the IP network 22 via Internet access VXML compiler 26. The VoiceXML execution client 12 couples to voice/data network platform hardware 24 via VoiceXML executor 28.

According to one embodiment, the Internet access VXML compiler 26 and/or the VoiceXML executor 28 may include at least one computer system having various processor(s), input/output, memory, data storage, and control devices. For example, the Internet access VXML compiler 26 and/or the VoiceXML executor 28 may also include, but not be limited to, a keyboard, mouse pointer, CD-ROM drive, network interface, data storage devices, and other devices. In addition, the Internet access VXML compiler 26 and/or VoiceXML executor 28 may include at least one of computer program software and a suitable computer operating system for carrying out the functions as discussed herein. Programming of computer software is accomplished using programming techniques known in the art.

FIG. 1 further illustrates a system 10 for use in development of VXML applications using VoiceXML execution tracking according to another embodiment. That is, system 10 may further include a developer workstation 30 coupled to VoiceXML execution client 12. More particularly, a VoiceXML editor/execution tracker 32 of the developer workstation 30 couples to the VoiceXML execution client 12.

With respect to the developer workstation 30 of FIG. 1, according to one embodiment, the workstation includes the VoiceXML editor/execution tracker 32 and a display device 34 remote from the VoiceXML execution client 12. Display device 34 operatively couples to tracker 32 for enabling a viewing of a VXML document listing during execution of the corresponding VXML document, further as discussed herein.

The editor/execution tracker 32 includes at least one computer system having various processor(s), input/output, memory, data storage, and control devices. For example, the tracker may include, but not be limited to, a keyboard, mouse pointer, CD-ROM drive, network interface, data storage devices, and other devices. In addition, the tracker 32 includes at least one of computer program software and a suitable computer operating system for carrying out the functions as discussed herein. Programming of computer software is accomplished using programming techniques known in the art.

According to another embodiment of the present disclosure, a tracking method provides trapping and controlling document execution during a real-time execution of the document in compiled form. As discussed herein, compiling of the VXML document by compiler 26 transforms the document into executable code for executor 28. Performing execution tracking by viewing the executable code alone, as compiled by the compiler and displayed upon display device 34, would be difficult to understand and follow in a real-time manner for debugging purposes. In contrast, the present illustrative embodiments enable a present real-time location of the executable code to be viewed within the VXML document listing on display device 34.

Upon initiation of execution tracking, document execution proceeds under debug and analysis control. For instance, a developer may wish to examine the logic of execution within the context of a listing of the VXML document visually in detail. The developer may also desire to examine the concomitant data visually in detail. Accordingly, the workstation 30 provides a communication connection with the VXML execution client 12, wherein workstation 30 is configured to enable trapping and controlling of VXML document execution, further as discussed herein.

Accordingly, the illustrative embodiments of the present disclosure enable tracking of the execution logic of a VXML document in real-time, in particular, for developers of VXML applications/documents. The illustrative embodiments are configured to facilitate an uncovering and/or determination of any logic errors within a VXML document. Upon a discovery of any such logic errors, the VXML document can be edited, as appropriate, to overcome the logic errors.

In addition, the execution tracking method provides for trapping a VXML document execution and bringing the document execution under real-time debug and analysis control. Debug and analysis control may include visually viewing a location of present document execution within the document listing on a display device. Debug and analysis may also include interrogation of one or more parameters or variables as the same exist at the point of paused execution of the VXML document. Debug and analysis may also further include modification of one or more parameters and/or variables modified as per developer input.

As a result, VXML document execution may be closely monitored at a desired pace. Display device 34 couples to the developer workstation 30 for enabling visual monitoring of the document execution, as discussed herein.

According to another embodiment, VXML compiler 26 compiles a requested VXML document of a VXML application and outputs executable code. The compiler adds markers in the executable code. For instance, the compiler places markers at the beginning of each VXML element in the executable code. Since the process of compiling the document in executable code will eliminate VXML language elements, the markers contain identification and document location information particular to a corresponding VXML element, as discussed further herein below.

When a developer desires to test a VXML document, the developer uses the workstation 30 having execution tracking capability as disclosed herein. For example, workstation 30 includes visual editor software such as commercially available from VoiceGenie Technologies of Toronto, Ontario Canada or Nuance Communications of Menlo Park, Calif. The visual editor software can be modified to include enhancements for communicating with the VXML document executor, displaying tracking information, and accepting tracking commands entered by a developer, as discussed herein. Since communication with the executor 28 is through messaging, the workstation 30 need not be the same machine as the executor 28. However, workstation 30 with the visual editor must have connectivity to the VoiceXML executor 28.

To begin execution tracking, the editor/tracker 32 of workstation 30 sends a command to the VoiceXML execution client 12 specifying the document name and any relevant trapping conditions. Responsive to the execution client 12 receiving a requested VXML document of the VXML application under test, and prior to beginning its execution, the execution client 12 sends the workstation 30 a message indicating that the requested document has been trapped (i.e., downloaded and prepared for tracking). The execution client 12 awaits instruction from the workstation 30, remaining in a paused state until instructed otherwise. Workstation 30 loads and displays one or more documents of the VXML application, including the VXML document source code as downloaded to the VXML execution client 12 by the document server 20 via the IP network 22.

When instructed to execute the VXML document, the executor 28 of VXML execution client 12 executes until it gets to a marker in the executable code. Upon detecting a marker, the executor 28 pauses the VXML document execution and sends a message to the workstation 30 with the information contained in the marker. In response to receiving the marker information, the workstation 30 uses the marker information to highlight on display 34, for the developer, the location in the VXML document where execution is paused. Highlighting may include bolding of text, reverse video display of relevant text, or other suitable manner for visually highlighting of relevant text in the VXML document source code listing. In this manner, the developer can readily follow the logic of document execution visually in the source code.

In addition to providing for visually monitoring the logic of the document execution, the editor/execution tracker 32 of workstation 30 also controls the execution of the VXML document. That is, the editor/execution tracker 32 can control execution of the VXML document on an element by element basis, in view of the markers in the executable code.

Execution of the VXML document continues in the above-described manner, with the executor 28 and the editor/execution tracker 32 exchanging messages subsequently, upon encountering the one or more markers in the code. Document execution continues in this manner until the document execution is complete, the editor/execution tracker 32 instructs the executor 28 to continue execution without tracking, or upon an occurrence of a document transition out of the current document. The workstation 30 may also be controlled, for example, by the developer, sending additional messages to the executor 28, to implement the display and modification of desired data at the workstation 30, or for execution of modified data by the executor 28.

To facilitate smooth operation of the executor 28, upon encountering a marker in an untrapped document or a released document (i.e., a document that is no longer trapped), the executor 28 disregards the marker and continues an execution of the VXML document. In other words, the executor 28 ignores the markers for untrapped documents or for documents that have been released from being trapped.

The addition of execution tracking to the VXML workstation 30 visual editor provides a feature not available with other commercially available VXML editor implementations. Accordingly, the present embodiments are provided with a clearly distinguishable feature and advantage.

FIG. 2 illustrates an example VoiceXML document, indicated by reference numeral 40, of a VoiceXML application 18 (FIG. 1). Note that VoiceXML application 18 may include one or more VoiceXML documents, not described herein for simplicity. In this example, the VoiceXML document 40 includes a header 42 containing standard heading XML information. A document information section 44 follows the header section 42. The document section 44 contains a dialog section 46 and the dialog section 46 contains an item 48. Notwithstanding the illustrative example of FIG. 2, the document section 44 may include one or more dialog sections and each dialog section 46 may contain one or more items. Each item 48 may contain one or more elements, further as discussed below.

As discussed herein, a VoiceXML application 18 can include one or more text files called VoiceXML documents 40. The VoiceXML documents reside on a web server 20 (i.e., a document server). Documents are accessed at the request of a VoiceXML execution client 12 that interprets the documents and presents the executed documents to an end user on the terminal 14 via platform hardware 24 and transmission network 16.

The VXML document files are denoted by a ".vxml" file extension and contain the various VoiceXML instructions of the application. The first instruction in a VoiceXML document to be seen by compiler 26 running on the VoiceXML execution client 12 is an XML version tag (e.g., <?xml version="1.0"?>). The remainder of the document's instructions are enclosed by a VXML tag (e.g., <vxml version="1.0">).

Inside of the <vxml> tag, a document includes one or more discrete dialog elements, referred to as forms. Each form has a name and is responsible for executing some portion of a dialog. For example, the form called "getTopping" (in document section 44 of FIG. 2) prompts the caller to make a selection from a list of options and then recognizes the response.

A form is denoted by the use of the <form> tag and can be specified by the inclusion of the id attribute to specify the form's name. This is useful if the form is to be referenced at some other point in the application or by another application. For example, <form id="getTopping"> indicates in the VoiceXML document the beginning of the "getTopping" form.

The VXML document may also include various elements for controlling dialog flow, performing recognition tasks, and handling events. A <field> item encapsulates a dialog unit. A <prompt> item prompts a user for input. A <grammar> item provides rules for recognizing the input. The <field> item further may capture any events appropriate to that portion of the dialog with a <catch> item. A given field item variable will be filled with the recognized caller response to a respective prompt.

FIG. 2 shows a listing view of a VoiceXML document named "http://orderhost/topping.vxml" containing the "getTopping" form. The "getTopping" form contains various elements for performing the task(s) required by the form. Elements that can be contained in the form are designated as "form items."

Form items include a group of elements that may be enclosed directly under the <form> tag to perform various tasks required by the application. Form items are divided into field items and control items.

Field items gather information from the caller to fill variables (field item variables). Field items can include <field>, <record>, <transfer>, <object>, and <subdialog>, for example, further as discussed in "Voice extensible Markup Language VoiceXML," Version 1.00, dated 7 Mar. 2000, written by the VoiceXML Forum. The <field> item gathers input from the user via speech or DTMF (dual tone multifrequency) recognition as defined by a grammar. The <record> item records an audio clip from an end-user. The <transfer> item transfers the user to another phone number. The <object> item invokes a platform-specific object that may gather user input, returning the result as a script object. Lastly, the <subdialog> item performs a call to another dialog or document, returning the result as a script object.

Control items enclose non-recognition based tasks. Control items can include <block> and <initial>. The <block> item encloses a sequence of statements for prompting and computation. The <initial> item controls mixed-initiative interactions within a form.

Flow control between forms, items, and documents may occur in a typical VXML application. For example, the VXML application may necessitate the use of multiple forms within a document. The VXML application may also require an ability to transition between these forms as dictated by a dialog. To transition between forms within a document, the document typically includes a <goto> tag. The <goto> element can also be used to transition to another form item in another <form> (dialog) in the current document, to another document, or to another form in another document.

When using the <goto> element, execution begins in the next portion of the dialog (e.g., contained in another form) as dictated by the logic of the application. If control is not explicitly passed from a current form, then execution stops upon reaching the end of the current form and the VXML application ends.

In addition to the above discussion, a VXML application can include a single document application or a multi-document application. A multi-document VXML application includes more than one document, the more than one document including a "root" document and one or more "supporting" documents.

The supporting documents enable an application developer to group various related dialog tasks of the application into individual documents. In addition, the supporting documents enable the application developer to create an application having smaller loadable pieces of what would otherwise amount to a large application. In other words, it may be desirable to create smaller loadable document files to reduce run-time delays associated with the loading larger document files.

When loading a supporting document, the VoiceXML execution client 12 also loads the root document. Doing so, the VoiceXML execution client maintains application scope information such as variables, links, and events. In the event that the document name is specified in a <goto> transition, the VoiceXML execution client 12 unloads the current document and loads the new document, reinitializing all variables of the document or of lesser scope.

FIG. 3 illustrates the example VoiceXML document 40 of FIG. 2 including markers 50(a)–50(k) according to one embodiment of the present disclosure. In this example, the markers 50(a)–50(k) are located just prior to each logical VXML element contained in the VoiceXML document 40. According to one embodiment, the compiler 26 and VoiceXML executor 28 (of FIG. 1) operate to place the markers 50(a)–50(k) into a compiled version of the document at the beginning of each logical VXML element, respectively, further as discussed herein.

FIG. 4 is a flow diagram 52 of the tracking method according to one embodiment of the present disclosure as performed by the developer workstation 30, and more particularly, VoiceXML editor/execution tracker 32 of FIG. 1. Beginning at Step 54, the editor/execution tracker 32 sends a trap command message to VoiceXML execution client 12. The trap command message informs execution client 12 to trap one or more desired documents of a given VoiceXML application, as discussed further herein.

Placing a telephone call via terminal 14 (FIG. 1) activates an execution of the VoiceXML application containing the desired VXML document, using techniques known in the art. In Step 56, tracker 32 awaits receipt of a notification message from VXML execution client 12. The notification message indicates to the tracker 32 that the VXML execution client 12 has trapped a desired VXML document and paused its execution. Accordingly, Step 56 repeats itself until a notification message has been received.

Upon receipt of the notification message, in Step 58, editor/execution tracker 32 of FIG. 1 generates a display of the trapped document upon display 34. The display of the trapped document includes a listing of at least a portion of the VXML document. A complete listing of an example VXML document is shown in FIG. 2. In Step 60, the method queries the editor/execution tracker 32 whether to continue tracking. If the editor/execution tracker 32 commands that tracking is not to continue, then the method proceeds to Step 62.

In Step 62, the editor/execution tracker 32 sends a command message to the VoiceXML execution client 12 to return the VXML document execution to normal. That is, the execution client 12 returns the execution of the VXML document to a normal execution mode. Accordingly, editor/execution tracker 32 ends a tracking of the particular VXML document. To track the document again, the editor/execution tracker 32 sends a subsequent trap command message to the VoiceXML execution client 12 for tracking an execution of the same document. The process repeats itself as discussed with respect to the flow diagram 52.

Returning to Step 60, if the editor/execution tracker 32 commands that tracking is to continue, then the method proceeds to Step 64. In Step 64, editor/execution tracker 32 sends a desired command message to VoiceXML executor 28. Exemplary commands may include, but not be limited to, interrogating and displaying the values of one or more variables of the VXML document, and/or advancing execution of the VXML document to a next occurrence of a marker. In this example, a developer can track the document execution and uncover any logic errors, furthermore, debugging and editing the VXML document as appropriate for the particular document and overall VoiceXML application. Editing of the VXML document can be accomplished using techniques known in the art.

In Step 66, editor/execution tracker 32 awaits receipt of a response message from VXML executor 28. The response message from the VXML executor 28 includes information generated by the VXML executor 28 in response to the command message. The response message may include marker information of a marker associated with a present location of the paused execution of the VXML document. For instance, if the executor 28 pauses execution of compiled VXML document at marker 50(f) (in FIG. 3), then the response message would include marker information corresponding to marker 50(f). As discussed herein, markers contain identification and document location information particular to a corresponding VXML element.

In Step 68, editor/execution tracker 32 extracts marker information from the response message. In addition, with the use of the marker information, the editor/execution tracker 32 highlights the corresponding text of the VXML document 40 displayed upon display device 34 of developer workstation 30, as previously discussed further herein. Subsequent to Step 68, the process returns to Step 60 and proceeds as discussed above.

Accordingly, the marker information is configured to enable the editor/execution tracker 32 to highlight a location of execution of the compiled VXML document in the displayed VXML document listing in a real-time manner. For example, if, in Step 68 of FIG. 4, the execution of the compiled VXML document at a given instance was at marker 50(g) of FIG. 3, then the highlighted portion of the displayed listing 40 as displayed upon display device 34 (FIG. 1) would include highlighted text identified by reference numeral 50(g)' in FIG. 2.

In addition to highlighting a real-time location of compiled document execution in the displayed VXML document listing as displayed upon display device 34 (FIG. 1), the editor/execution tracker 32 can also interrogate parameters, variables, and the logic of execution within the VXML document in a real-time manner. The editor/execution tracker 32 operates, as desired, according to a particular tracking session and/or other tracking criteria, such as in debugging a logic of a particular VXML document or documents.

Highlighting may include, but not be limited to, for example, distinguishing relevant portion(s) of the VXML document listing on the display 34 from the non-relevant portion(s). For example, in FIG. 2, the text "<filed namelist="topping"> could be highlighted by dashed lines surrounding the same, as indicated by reference numeral 70. The highlighted portion corresponds to the real-time paused location of the compiled version of the VXML document.

Alternatively, highlighting may include other suitable forms. For example, highlighting may include a graphic location pointer 72, such as an arrow or other suitable graphic, pointing to the relevant portion(s) in the listing of the VXML document as displayed upon display device 34. Highlighting may also include a reverse video display of the relevant portion(s). Still further, other suitable forms of highlighting may be implemented.

Accordingly, the editor/execution tracker 32 displays a requested VXML document listing upon display device 34 and having the real-time location of the execution of the compiled VXML document visually identified. With the real-time tracking display of the VXML document listing according to the present illustrative embodiments, the editor/execution tracker enables a developer to visually observe the VXML document execution at one or more of the marker locations of the VXML document, for example, at markers 50(*a*)–50(*k*) of FIG. 3 for debugging and/or other desired purposes.

Figure 5:
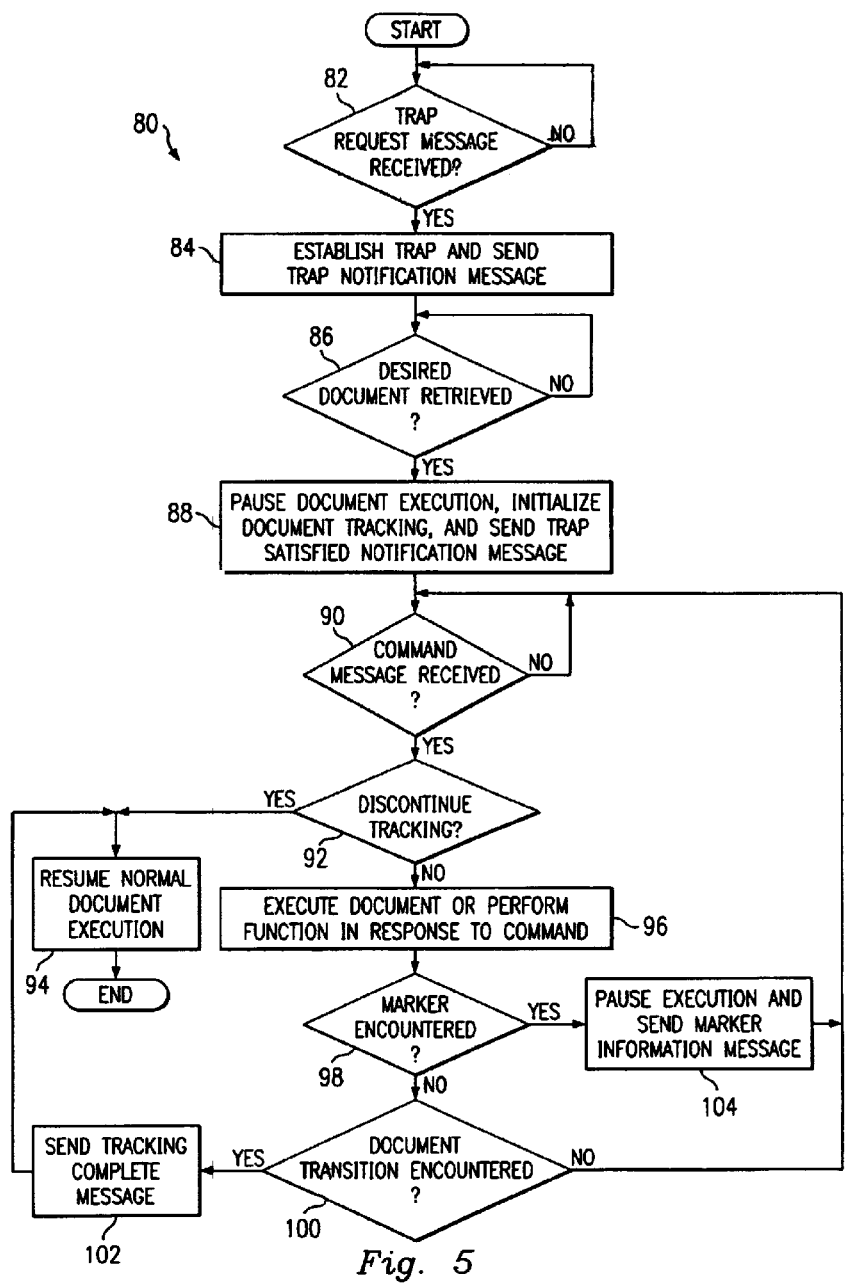
FIG. 5 is a flow diagram view of the tracking method according to one embodiment of the present disclosure as performed by a VoiceXML execution client.

Turning now to FIG. 5, a flow diagram 80 illustrates steps carried out by executor 28 of VoiceXML Execution client 12. In step 82, executor 28 awaits receipt of a trap request message from editor/execution tracker 32 of developer workstation 30. The trap request message includes, for example, identification of at least one VXML document for execution tracking. Responsive to receipt of trap request message, executor 28 establishes a trap for the desired VXML document or documents. The trap may include monitoring of VXML documents downloaded from the document server for the at least one VXML document identified in the trap request message and pausing an execution thereof upon a downloading of the same. In step 84, executor 28 further sends a trap notification message to editor execution tracker 32.

In step 86, executor 28 awaits receipt of the desired VXML document, for example, via downloading from the document server 20 in the IP network 22. Upon retrieval of the desired document, the process advances to step 88. In step 88, executor 28 pauses on execution of the VXML document, initializes document tracking, and sends a trap satisfied notification message to editor/execution tracker 32. In one embodiment, initializing document tracking includes compiling the VXML document and adding markers as discussed herein. The process advances to step 90.

In step 90, executor 28 awaits receipt of a command message from editor/execution tracker 32. In response to receipt of a command message, the process advances to step 92. In step 92, a query is made of the command message content whether to discontinue tracking. If the query indicates tracking is to be discontinued, then in step 94, executor 28 resumes a normal execution of the VXML document and the process ends. Any markers encounter from that point forward in the VXML document would be overlooked or disregarded by executor 28.

Returning now to step 92, if the query indicates that tracking is to continue, then the process advances to step 96. In step 96, executor 28 executes the document until a next occurrence of a marker or performs a function in response to a command received in the command message of step 90. In step 98, executor 28 queries whether a marker is encountered. If no marker is encountered then the process advances to step 100.

In step 100, executor 28 queries whether a document transition has been encountered. A document transition includes, for example, a program call outside of the current document. If executor 28 detects a document transition, then in step 102, executor 28 sends a tracking complete message to editor/execution tracker 32. Subsequent to step 102, executor 28 resumes a normal document execution in step 94.

Returning now to step 98, if executor 28 encounters a marker, then in step 104, executor pauses the document execution and sends a marker information message to editor/execution tracker 32. The process then continues, beginning again at step 90, where executor 28 awaits receipt of a command message from editor/execution tracker 32.

Returning now to step 100, if executor 28 encounters no document transition, then the process continues beginning again at step 90. As discussed, in step 90, executor 28 awaits receipt of a command message from editor/execution tracker 32.

As mentioned herein above, a typical VXML client executor executes a VXML document by: 1) downloading a document from a web server using the associated Universal Resource Locator (URL); 2) compiling the document into an executable form; 3) executing the compiled form of the document; 4) requesting the next document, based upon information resulting from execution, and 5) repeating at step 1, or ending the call if no further documents are to be executed.

In operation, terminal 14 places a telephone call to initiate execution of a VoiceXML application. According to one embodiment of the present disclosure, a particular document or series of documents of the VXML application are trapped in real-time for enabling editor/execution tracker interaction and visual inspection of execution of the same. More particularly, developer workstation 30 issues trap messages for trapping an execution of one or more desired VXML documents of a given VXML application, facilitates a real-time monitoring of the logic contained in a desired VXML document during document execution, and enables interrogation of data variables for the respective VXML document during its execution.

Accordingly, the embodiments enable a developer to visually monitor the document logic and data parameter values during document execution. The developer can visually inspect the execution of the VXML document while interactively controlling the execution of executing the same.

In the development of a VXML application, editor/execution tracker 32 is configured to slow down and interactively step through the execution of a given VXML document of the application. In addition, the editor/execution tracker 32 interrogate the various data variables during the stepped execution of the document.

Accordingly, logic errors can more readily be determined and corrective action taken during the development of a VXML application. This is in contrast to collecting masses of post-execution data and analyzing the same for any such logic errors in one or more VXML documents during the development of a VXML application.

According to another embodiment, the method of the present disclosure utilizes markers and marker message information. The marker message information defines identification and document location information particular to respective logical elements of the VXML document under review. Execution of the VXML document is paused at respective marker locations of the VXML document, until such time as the executor received a command or instruction otherwise.

In a compiler environment, the compiler creates an executable program. For each occurrence of a logical element in a VXML document, a marker is inserted just prior to the logical element in the compiled document. The VoiceXML executor is then ready to execute the compiled document according to the methods of the present disclosure. The markers include marker message information. The marker message information identifies the respective logical element and its location within the VXML document, as is discussed further herein.

While the above discussion refers to the use of compiler 26 and VXML executor 28 within VoiceXML execution client 12, an interpretive VXML executor may also be used. With respect to an interpretive VoiceXML executor, the executor is modified to include appropriate processing code for recognizing the occurrence of a VXML logic element of a desired VXML document and for communicating such occurrence with the editor/execution tracker 32 of workstation 30. The interpretive VoiceXML executor would then carry out an interactive document execution as discussed herein with respect to the compiled document execution.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

The invention claimed is:

1. A method for tracking execution of a Voice Extensible Markup Language ("VoiceXML") document of a VoiceXML application by a Voice XML execution client comprising:
responsive to receiving a request for tracking execution of a VoiceXML document, monitoring at the VoiceXML execution client a downloading of VoiceXML documents for the requested VoiceXML document;
responsive to downloading the requested VoiceXML document, trapping the requested VoiceXML document, the trapping comprising compiling the VoiceXML document into executable code, the executable code including marker information including at least one marker for identifying at least one VoiceXML element and a respective location of the at least one VoiceXML element within the XML document;
responsive to trapping the requested VoiceXML document, displaying source code of the requested VoiceXML document on a display of a visual editor device; and
responsive to receipt of a tracking command message, executing the trapped VoiceXML document in an execution tracking mode as a function of the marker information.

2. The method of claim 1, wherein the marker information is configured to enable a highlighting of the corresponding VoiceXML element within a listing of the VoiceXML documents on a remote display device.

3. The method of claim 1, further comprising:
responsive to trapping the requested VoiceXML document, generating a notification message for indicating a capture of the requested VoiceXML document for execution tracking.

4. The method of claim 1, further comprising:
responsive to a detection of an occurrence of a VoiceXML element during execution tracking of the trapped VoiceXML document, pausing execution of the trapped VoiceXML document and awaiting receipt of a tracker command message, wherein the tracker command message includes at least one of interrogate a variable of the VoiceXML document, continue execution with tracking, and continue execution without tracking.

5. The method of claim 1 further comprising:
responsive to a detection of an occurrence of a VoiceXML element during execution tracking, generating a marker information message for identifying the VoiceXML element and its respective location within the VoiceXML document.

6. The method of claim 5, further comprising:
sending the marker information message to the visual editor device, wherein responsive to receipt of the marker information message, the visual editor device highlights in the source code of the VoiceXML document displayed on the visual editor device the VoiceXML element corresponding to the location in the VoiceXML document where execution is paused.

7. The method of claim 1, wherein downloading of VoiceXML documents occurs via a web server.

8. A Voice Extensible Markup Language ("VoiceXML") execution client comprising computer-executable instructions stored on a computer-readable medium, the instructions for implementing:
a VoiceXML executor having at least one input for receiving a tracking message, the tracking message including at least a request for execution tracking of a VoiceXML document; and
a VoiceXML compiler operatively coupled to said VoiceXML executor, the VoiceXML compiler responsive to receipt of the tracking message by said VoiceXML executor for monitoring a downloading of the VoiceXML document and in response to downloading of the VoiceXML document, said VoiceXML compiler generating executable code configured for execution tracking, the executable code including marker information, wherein responsive to the executable code, said VoiceXML executor executes the Voice XML document in an execution tracking mode as a function of the marker information;
wherein the marker information includes at least one marker for identifying at least one VoiceXML element and a respective location of the at least one VoiceXML element within the VoiceXML document.

9. The VoiceXML execution client of claim 8, wherein said VoiceXML executor further generates at least one marker information message in response to a detection of the at least one marker in the executable code during execution tracking, the at least one marker information message containing marker information configured to identify a respective VoiceXML element and its respective location within the VoiceXML document.

10. The VoiceXML execution client of claim 9, further wherein the at least one marker information message is configured to enable highlighting of the respective VoiceXML element in a display listing of the VoiceXML document.

11. The VoiceXML execution client of claim 8, wherein said VoiceXML executor performs execution tracking further as a function of an additional tracking message, wherein the additional tracking message includes at least one of interrogate a variable of the VoiceXML document, continue execution with tracking, and continue execution without tracking.

12. The VoiceXML execution client of claim 8, wherein responsive to detecting the downloading of the VoiceXML document by said VoiceXML compiler and prior to compilation of the VoiceXML document, said VoiceXML executor further for pausing an execution of the VoiceXML document and initializing the VoiceXML document for execution tracking.

13. The VoiceXML execution client of claim 11, further wherein initializing the VoiceXML document for execution tracking includes generating the marker information, the marker information including at least one marker for identifying at least one VoiceXML element contained within the VoiceXML document and for identifying a respective location of the at least one VoiceXML element within the VoiceXML document.

14. The VoiceXML execution client of claim 13, further wherein said VoiceXML executor configures the marker information to enable a highlighting of a respective at least one VoiceXML element in a display listing of the VoiceXML document on a remote display device.

15. The VoiceXML execution client of claim 8, wherein the execution tracking mode includes an interactive execution of the VoiceXML document responsive to a detection of an occurrence of a VoiceXML element within the VoiceXML document, further wherein said VoiceXML executor generates message information configured to enable a highlighting of the respective VoiceXML element within a listing of the VoiceXML document on a remote display device.

16. A Voice Extensible Markup Language ("VoiceXML") execution client comprising computer-executable instructions stored on a computer-readable medium, the instructions for implementing:
 a VoiceXML executor having at least one input for receiving a tracking message, the tracking message including at least a request for execution tracking of a VoiceXML document; and
 a VoiceXML interpreter operatively coupled to said VoiceXML executor, the VoiceXML interpreter, responsive to receipt by the VoiceXML executor of the tracking message, for monitoring a downloading of the VoiceXML document and in response to downloading of the VoiceXML document, said VoiceXML interpreter further for generating an executable interpretation of the VoiceXML document, the executable interpretation including marker information, wherein responsive to the executable interpretation, said VoiceXML executor executes the VoiceXML document in an execution tracking mode as a function of the marker information;
 wherein the marker information includes at least one marker for identifying at least one VoiceXML element and a respective location of the at least one VoiceXML element within the VoiceXML document.

17. The VoiceXML execution client of claim 16, wherein said VoiceXML executor configures the marker information to enable a highlighting of a respective at least one VoiceXML element within a listing of the VoiceXML document on a remote display device.

18. A method for tracking execution of a Voice Extensible Markup Language ("VoiceXML") document of a VoiceXML application comprising:
 transmitting a tracking command message to a VoiceXML execution client, the tracking command message including at least a request for tracking execution of the VoiceXML document;
 responsive to notification message indicating receipt of the execution tracking request by the VoiceXML execution client, displaying a listing of at least a portion of the VoiceXML document upon at least one display as a function of the notification message;
 transmitting at least one further tracking command message to the execution client, the at least one further tracking command message comprising a tracking command message selected from a group consisting of interrogate a parameter of the VoiceXML document, continue execution with tracking, and continue execution without tracking, wherein the execution client executes the VoiceXML document in an execution tracking mode as a function of at least one further tracking command message; and
 responsive to receipt of a tracking information message from the VoiceXML execution client, the tracking information message including at least marker information, highlighting at least one portion of the VoiceXML document text on the at least one display as a function of the marker information;
 wherein the marker information includes at least one marker for identifying at least one VoiceXML element and a respective location of the at least one VoiceXML element within the VoiceXML document.

19. The method of claim 18, wherein the at least one further tracking command message includes at least one of interrogate a parameter of the VoiceXML document, continue execution with tracking, and continue execution without tracking.

20. The method of claim 18, wherein execution tracking of the VoiceXML document by the VoiceXML execution client includes pausing execution upon a detection of an occurrence of a VoiceXML element within the VoiceXML document, and wherein marker information includes information for enabling a highlighting of the respective VoiceXML element within the VoiceXML document.

21. A Voice Extensible Markup Language ("VoiceXML") execution tracker apparatus for tracking execution of a VoiceXML document of a VoiceXML application comprising:
 at least one output for transmitting a tracking command message to a VoiceXML execution client, the tracking command message including at least a request for tracking execution of the VoiceXML document;
 at least one display for displaying a listing of at least a portion of the VoiceXML document as a function of a notification message, the notification message indicating receipt of the execution tracking request by the VoiceXML execution client, wherein said at least one output is further for transmitting at least one additional tracking command message to the execution client, the at least one additional tracking command message comprising a tracking command message selected from a group consisting of interrogate a parameter of the VoiceXML document, continue execution with tracking, and continue execution without tracking, wherein the execution client executes the VoiceXML document in an execution tracking mode as a function of at least one additional tracking command message; and means, responsive to receipt of a tracking information message from the VoiceXML execution client, the tracking information message including at least marker information, for highlighting at least one portion of the VoiceXML document text on said at least one display as a function of the marker information;

wherein the marker information includes at least one marker for identifying at least one VoiceXML element and a respective location of the at least one VoiceXML element within the VoiceXML document.

22. The apparatus of claim 21, wherein the at least one additional tracking command message includes at least one of interrogate a parameter of the VoiceXML document, continue execution with tracking, and continue execution without tracking.

23. The apparatus of claim 21, wherein execution tracking of the VoiceXML documents by the VoiceXML execution client includes pausing execution upon a detection of an occurrence of a VoiceXML element within the VoiceXML document, an wherein marker information includes information configured to enable a highlighting of the respective VoiceXML element within the listing of the VoiceXML document.

* * * * *